United States Patent
Kariatsumari et al.

(10) Patent No.: US 8,862,323 B2
(45) Date of Patent: *Oct. 14, 2014

(54) MOTOR CONTROL DEVICE AND VEHICLE-STEERING DEVICE COMPRISING SAME

(75) Inventors: Yuji Kariatsumari, Yamatotakada (JP); Hideki Higashira, Ikoma (JP); Masashi Hattori, Nara (JP); Yoshinobu Shimizu, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/997,168

(22) PCT Filed: Jun. 29, 2009

(86) PCT No.: PCT/JP2009/002991
§ 371 (c)(1),
(2), (4) Date: Dec. 9, 2010

(87) PCT Pub. No.: WO2010/001579
PCT Pub. Date: Jan. 7, 2010

(65) Prior Publication Data
US 2011/0098888 A1    Apr. 28, 2011

(30) Foreign Application Priority Data
Jun. 30, 2008  (JP) ................... 2008-171496

(51) Int. Cl.
*B62D 5/04* (2006.01)
*B62D 5/14* (2006.01)
*H02P 21/04* (2006.01)
*H02P 21/00* (2006.01)

(52) U.S. Cl.
CPC ............... *B62D 5/046* (2013.01); *H02P 21/04* (2013.01); *H02P 21/0003* (2013.01); *H02P 21/0042* (2013.01)

USPC .............................................. 701/41; 701/42

(58) Field of Classification Search
CPC ..... B62D 5/046; B62D 5/0463; B62D 5/0472
USPC ............... 701/41–42; 180/412–423, 443–447
See application file for complete search history.

(56) References Cited

U.S. PATENT DOCUMENTS
5,513,720 A  5/1996  Yamamoto et al.
5,568,389 A  10/1996  McLaughlin et al.
(Continued)

FOREIGN PATENT DOCUMENTS
EP  1 487 098 A1  12/2004
EP  1 955 926 A2  8/2008
(Continued)

OTHER PUBLICATIONS

International Preliminary Report on Patentability dated Feb. 8, 2011 in corresponding International Application No. PCT/JP2009/002991 (with translation).

(Continued)

*Primary Examiner* — Helal A Algahaim
*Assistant Examiner* — Charles J Han
(74) *Attorney, Agent, or Firm* — Oliff PLC

(57) ABSTRACT

A motor controller controls a motor including a rotor and a stator opposed to the rotor. The motor controller includes an electric current driving unit which drives the motor with an axis electric current value defined in a rotating coordinate system defined with respect to a control angle that is a rotation angle for control, a control angle computing unit which computes a current value of the control angle by adding an addition angle to a previous value of the control angle in each predetermined computing cycle, and an addition angle computing unit which computes the addition angle according to a torque to be generated by the motor or a response of the motor to the axis electric current value.

5 Claims, 10 Drawing Sheets

(56) References Cited

U.S. PATENT DOCUMENTS

| | | | |
|---|---|---|---|
| 5,928,298 | A | 7/1999 | Matsuoka et al. |
| 6,364,051 | B1 | 4/2002 | Kada et al. |
| 6,396,229 | B1 | 5/2002 | Sakamoto et al. |
| 6,397,969 | B1 | 6/2002 | Kasai et al. |
| 6,781,333 | B2 | 8/2004 | Koide et al. |
| 7,076,340 | B1 | 7/2006 | Inazumi et al. |
| 2002/0026270 | A1 | 2/2002 | Kurishige et al. |
| 2002/0180402 | A1* | 12/2002 | Koide et al. .................. 318/727 |
| 2003/0030404 | A1 | 2/2003 | Iwaji et al. |
| 2004/0267421 | A1* | 12/2004 | Eskritt et al. .................. 701/41 |
| 2005/0029972 | A1 | 2/2005 | Imai et al. |
| 2005/0257994 | A1 | 11/2005 | Fujita |
| 2005/0273236 | A1 | 12/2005 | Mori et al. |
| 2006/0086561 | A1 | 4/2006 | Hidaka |
| 2006/0090954 | A1 | 5/2006 | Sugitani et al. |
| 2006/0125439 | A1 | 6/2006 | Ajima et al. |
| 2007/0040528 | A1 | 2/2007 | Tomigashi et al. |
| 2007/0229021 | A1 | 10/2007 | Yoshida et al. |
| 2007/0273317 | A1 | 11/2007 | Endo et al. |
| 2007/0284181 | A1 | 12/2007 | Muranaka |
| 2008/0035411 | A1 | 2/2008 | Yamashita et al. |
| 2008/0047775 | A1* | 2/2008 | Yamazaki .................. 180/443 |
| 2008/0128197 | A1 | 6/2008 | Kawaguchi et al. |
| 2008/0201041 | A1* | 8/2008 | Jiang .................. 701/42 |
| 2009/0069979 | A1 | 3/2009 | Yamashita et al. |
| 2009/0240389 | A1 | 9/2009 | Nomura et al. |
| 2010/0057300 | A1 | 3/2010 | Nishiyama |
| 2010/0094505 | A1 | 4/2010 | Kariatsumari et al. |
| 2010/0198462 | A1 | 8/2010 | Shinoda et al. |
| 2010/0263709 | A1 | 10/2010 | Norman et al. |
| 2011/0035114 | A1 | 2/2011 | Yoneda et al. |
| 2012/0080259 | A1 | 4/2012 | Ueda et al. |

FOREIGN PATENT DOCUMENTS

| | | |
|---|---|---|
| EP | 2 086 106 A2 | 8/2009 |
| EP | 2 159 133 A1 | 3/2010 |
| EP | 2 177 422 A2 | 4/2010 |
| EP | 2 216 895 A2 | 8/2010 |
| JP | A-04-161085 | 6/1992 |
| JP | A-6-305436 | 11/1994 |
| JP | A 9-226606 | 9/1997 |
| JP | A 10-76960 | 3/1998 |
| JP | A 10-243699 | 9/1998 |
| JP | A-2000-050689 | 2/2000 |
| JP | A-2001-37281 | 2/2001 |
| JP | A-2001-251889 | 9/2001 |
| JP | A-2002-359996 | 12/2002 |
| JP | A-2003-125594 | 4/2003 |
| JP | A 2003-182620 | 7/2003 |
| JP | A-2007-053829 | 3/2007 |
| JP | A 2007-267549 | 10/2007 |
| JP | A-2007-267549 | 10/2007 |
| JP | A 2008-24196 | 2/2008 |
| JP | A 2008-087756 | 4/2008 |
| JP | A 2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

International Search Report dated Oct. 6, 2009 in corresponding International Application No. PCT/JP2009/002991 (wth translation).
U.S. Appl. No. 12/823,573, filed Jun. 25, 2010.
U.S. Appl. No. 13/685,152, filed Nov. 26, 2012.
U.S. Appl. No. 12/696,604, filed Jan. 29, 2010.
U.S. Appl. No. 12/945,101, filed Nov. 12, 2010.
U.S. Appl. No. 12/946,187, filed Nov. 15, 2010.
U.S. Appl. No. 13/205,138, filed Aug. 8, 2011.
U.S. Appl. No. 12/943,514, filed Nov. 10, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Nov. 7, 2013 Office Action issued in U.S. Appl. No. 13/685,152.
Jul. 17, 2013 Office Action issued in U.S. Appl. No. 13/685,152.
Jul. 20, 2010 Search Report issued in European Patent Application No. 10156226.
May 24, 2012 Office Action issued in U.S. Appl. No. 12/721,855.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep. 10, 2012 Office Action issued in U.S. Appl. No. 13/205,138.
Aug. 31, 2012 Office Action issued in U.S. Appl. No. 12/943,514.
Mar. 22, 2013 Office Action issued in U.S. Appl. No. 12/943,514.
Sep. 10, 2013 Office Action issued in U.S. Appl. No. 12/943,514.
Feb. 2, 2014 Office Action issued in U.S. Appl. No. 12/943,514.
Extended European Search Report issued in European Application No. 10191142.8 dated Jun. 8, 2011.
May 22, 2014 Office Action issued in Japanese Patent Application No. 2010-186220 (with translation).

* cited by examiner

MOTOR CONTROL DEVICE AND VEHICLE-STEERING DEVICE COMPRISING SAME

TECHNICAL FIELD

The present invention relates to a motor controller for driving a brushless motor, and to a vehicle steering apparatus including the motor controller. One example of the vehicle steering apparatus is an electric power steering apparatus.

BACKGROUND ART

A motor controller for controlling the driving of a brushless motor is generally constructed so as to control the supply of a motor electric current according to an output of a rotation angle sensor which detects the rotation angle of a rotor. A resolver which outputs a sine-wave signal and a cosine-wave signal for the rotor rotation angle (electrical angle) is typically used as the rotation angle sensor. However, the resolver is expensive, and requires a greater number of wirings and a greater installation space. This disadvantageously prevents the cost reduction and the size reduction of an apparatus including the brushless motor.

To cope with this, a sensorless driving system is proposed, which is adapted to drive the brushless motor without using the rotation angle sensor. In the sensorless driving system, the phase of a magnetic pole (the electrical angle of the rotor) is estimated by estimating an inductive voltage occurring due to the rotation of the rotor. When the rotor is stopped or rotated at a very low speed, it is impossible to estimate the inductive voltage, so that the phase of the magnetic pole is estimated by other method. More specifically, a sensing signal is inputted to a stator, and a response of the motor to the sensing signal is detected. The rotational position of the rotor is estimated based on the motor response.

CITATION LIST

Patent Literature

Patent Literature 1: JP-A-2007-267549

SUMMARY OF INVENTION

Technical Problem

The sensorless driving system described above estimates the rotational position of the rotor by using the inductive voltage and the sensing signal, and controls the motor based on the estimated rotational position. However, this driving system is not properly adapted for any specific applications. For example, no sensorless driving technique is established yet for controlling a brushless motor used as a driving source of an electric power steering system which applies a steering assist force to a steering mechanism of a motor vehicle. Accordingly, there is a demand for other type of sensorless control system.

It is an object of the present invention to provide a motor controller capable of controlling a motor by a novel control system employing no rotation angle sensor, and to provide a vehicle steering apparatus employing such a motor controller.

Solution to Problem

According to one aspect of the present invention, there is provided a motor controller for controlling a motor (3) including a rotor (50) and a stator (55) opposed to the rotor, the motor controller including: an electric current driving unit (31 to 36, 31A, 45) which drives the motor with an axis electric current value ($I_\gamma^*$) defined in a rotating coordinate system defined with respect to a control angle ($\theta_C$) that is a rotation angle for control; a control angle computing unit (26) which computes a current value of the control angle by adding an addition angle ($\alpha$) to a previous value of the control angle in each predetermined computing cycle; and an addition angle computing unit (23, 40, 47, 49) which computes the addition angle according to a torque to be generated by the motor or a response of the motor to the axis electric current value. Parenthesized alphanumeric characters in this section indicate corresponding components in embodiments to be described later, which, however, is not intended to limit the scope of the present invention.

With this arrangement, the motor is driven with the axis electric current value (hereinafter referred to as "virtual axis electric current value") defined in the rotating coordinate system defined with respect to the control angle ($\gamma\delta$ coordinate system, hereinafter referred to as "virtual rotating coordinate system" which has coordinate axes called "virtual axes"), while the control angle is updated by the addition of the addition angle in each computing cycle. The addition angle has a value computed according to the torque to be generated by the motor or the response of the motor to the axis electric current value. This makes it possible to generate a required torque by driving the motor with the virtual axis electric current value while updating the control angle, i.e., while updating the coordinate axes (virtual axes) of the virtual rotating coordinate system. Thus, the motor can properly generate the torque without the use of the rotation angle sensor.

The motor controller preferably further includes a limiting unit (24) which limits the addition angle. With this arrangement, the addition angle is properly limited, whereby an excessively great addition angle for the actual rotation of the rotor is substantially prevented from being added to the control angle. More specifically, the addition angle is limited so as to be set within a proper angular range for the rotation speed range of the rotor. Thus, the motor can be properly controlled.

The limiting unit may be adapted, for example, to limit the absolute value of the addition angle to not greater than a limit value given by the following expression:

$$\text{Limit value} = \text{Maximum rotor angular speed} \times \text{Computing cycle}$$

wherein "maximum rotor angular speed" is the maximum value of the rotor angular speed based on the electrical angle.

Where the rotation of the motor is transmitted to a steering shaft of a vehicle steering apparatus via a speed reduction mechanism having a predetermined speed reduction ratio, for example, the maximum rotor angular speed is given by an expression of Maximum steering angular speed (Maximum rotational angular speed of steering shaft)×Speed reduction ratio×Number of polar pairs. The number of polar pairs means the number of pairs of poles (N/S poles) of the rotor.

According to another aspect of the present invention, there is provided a vehicle steering apparatus, which includes: a motor (3) which applies a driving force to a steering mechanism (2) of a motor vehicle; a torque detecting unit (1) which detects a steering torque applied to an operation member operated for steering the motor vehicle; and the aforesaid motor controller (5) for controlling the motor, wherein the addition angle computing unit (22, 23, 40) computes the addition angle according to the steering torque detected by the torque detecting unit.

The torque to be generated by the motor as the driving source of the vehicle steering apparatus corresponds to the steering torque, so that the driving force can be applied to the steering mechanism according to a driver's intention for the steering. According to this inventive aspect, the addition angle is computed according to the steering torque. Since the control angle is updated according to the steering torque, the shift amount (load angle) of the virtual axis from the coordinate axis of the rotating coordinate system (dg coordinate system) extending through the magnetic poles of the rotor corresponds to the steering torque. As a result, the torque is properly generated by the motor according to the steering torque, so that the driving force can be applied to the steering mechanism according to the driver's steering operation.

Where the operation member and the steering mechanism are mechanically coupled to each other in the vehicle steering apparatus, the response of the motor to the virtual axis electric current value (the torque generated by the motor) appears as a change in steering torque. In the vehicle steering apparatus having such a construction, therefore, the computation of the addition angle according to the steering torque is equivalent to the computation of the addition angle according to the response of the motor to the virtual axis electric current value.

The vehicle steering apparatus may further include a command steering torque setting unit (21) which sets a command steering torque. The addition angle computing unit (22, 23) is preferably adapted to compute the addition angle according to a deviation of the steering torque detected by the torque detecting unit from the command steering torque set by the command steering torque setting unit.

With this arrangement, the command steering torque is set, and the addition angle is computed according to the deviation of the steering torque (detected value) from the command steering torque. The addition angle is determined so that the steering torque is equal to the command steering torque, and the control angle is set according to the addition angle. With the command steering torque thus properly set, therefore, the motor properly generates the driving force, which is in turn applied to the steering mechanism.

If the command steering torque is set at zero in an electric power steering apparatus, for example, the motor is controlled so that the steering torque becomes zero. Thus, the driver can perform the steering operation without feeling a steering resistance. Such a control operation is an example of a sensorless control which is, for example, continuously performed when a rotation angle sensor malfunctions, or performed in an emergency when a normal control operation cannot be performed due to malfunctions of sensors and other devices. Where it is desirable to provide the steering resistance to some extent, the command steering torque is set to a nonzero value. Thus, the driver can perform the steering operation while feeling the steering resistance.

The vehicle steering apparatus may further include a steering angle detecting unit (4) which detects the steering angle of the operation member. The command steering torque setting unit is preferably adapted to set the command steering torque according to the steering angle detected by the steering angle detecting unit.

With this arrangement, the command steering torque is set according to the steering angle of the operation member, so that the motor can properly generate the torque according to the steering angle. Thus, the driver can obtain a proper steering feeling.

The command steering torque setting unit may be adapted to set the command steering torque according to the vehicle speed of the motor vehicle detected by a vehicle speed detecting unit (6) which detects the vehicle speed of the motor vehicle.

With this arrangement, the command steering torque is set according to the vehicle speed, so that a vehicle speed-responsive control operation can be performed. An excellent steering feeling can be provided by setting the command steering torque at a lower level for a higher vehicle speed.

The vehicle steering apparatus may further include an abnormality judging unit (30) which determines the occurrence of an abnormality when the absolute value of a deviation of the steering torque detected by the torque detecting unit from the command steering torque set by the command steering torque setting unit is not less than a predetermined deviation threshold, or when the absolute value of the steering torque detected by the torque detecting unit is not less than a predetermined torque threshold.

With this arrangement, the judgment on the abnormality is based on the deviation of the steering torque from the command steering torque, or based on the steering torque. Thus, the vehicle steering apparatus can have a self-diagnosis function.

It is preferred that, when the occurrence of the abnormality is determined, the electric current to be supplied to the motor is controlled to be zero so as to substantially prevent the motor from becoming a load (resistance) to the steering mechanism. This makes it possible to drive the steering mechanism by operating the operation member (to perform a so-called manual steering operation).

The electric current driving unit (45) may be adapted to generate an axis electric current value including an angle estimation electric current value. The addition angle computing unit preferably further includes a load angle computing unit (49) which computes a load angle as the addition angle based on a response of the motor to the angle estimation electric current value, the load angle being a difference between the control angle and a rotation angle of the rotor.

With this arrangement, the angle estimation electric current value is supplied to the virtual axis, and the response of the motor to the supply of the angle estimation electric current value is detected. The torque generated by the motor corresponds to the load angle which is a difference (angular difference) between the virtual axis and the dq coordinate axis. Therefore, the load angle can be estimated from a relationship between the angle estimation electric current value and the motor response (particularly, an electric current component contributory to the torque or the generation of the torque). The actual rotation angle of the rotor can be estimated by adding the load angle as the addition angle to the control angle. This makes it possible to control the motor without the need for the rotation angle sensor.

In the vehicle steering apparatus (e.g., electric power steering apparatus) in which the operation member and the steering mechanism are mechanically coupled to each other, a change in motor torque with respect to the angle estimation electric current value appears as a change in steering torque. In the vehicle steering apparatus having such a construction, therefore, the load angle can be computed according to the change in steering torque with respect to the angle estimation electric current value.

The foregoing and other objects, features and effects of the present invention will become more apparent from the following description of embodiments with reference to the attached drawings.

DESCRIPTION OF EMBODIMENTS

Figure 1:
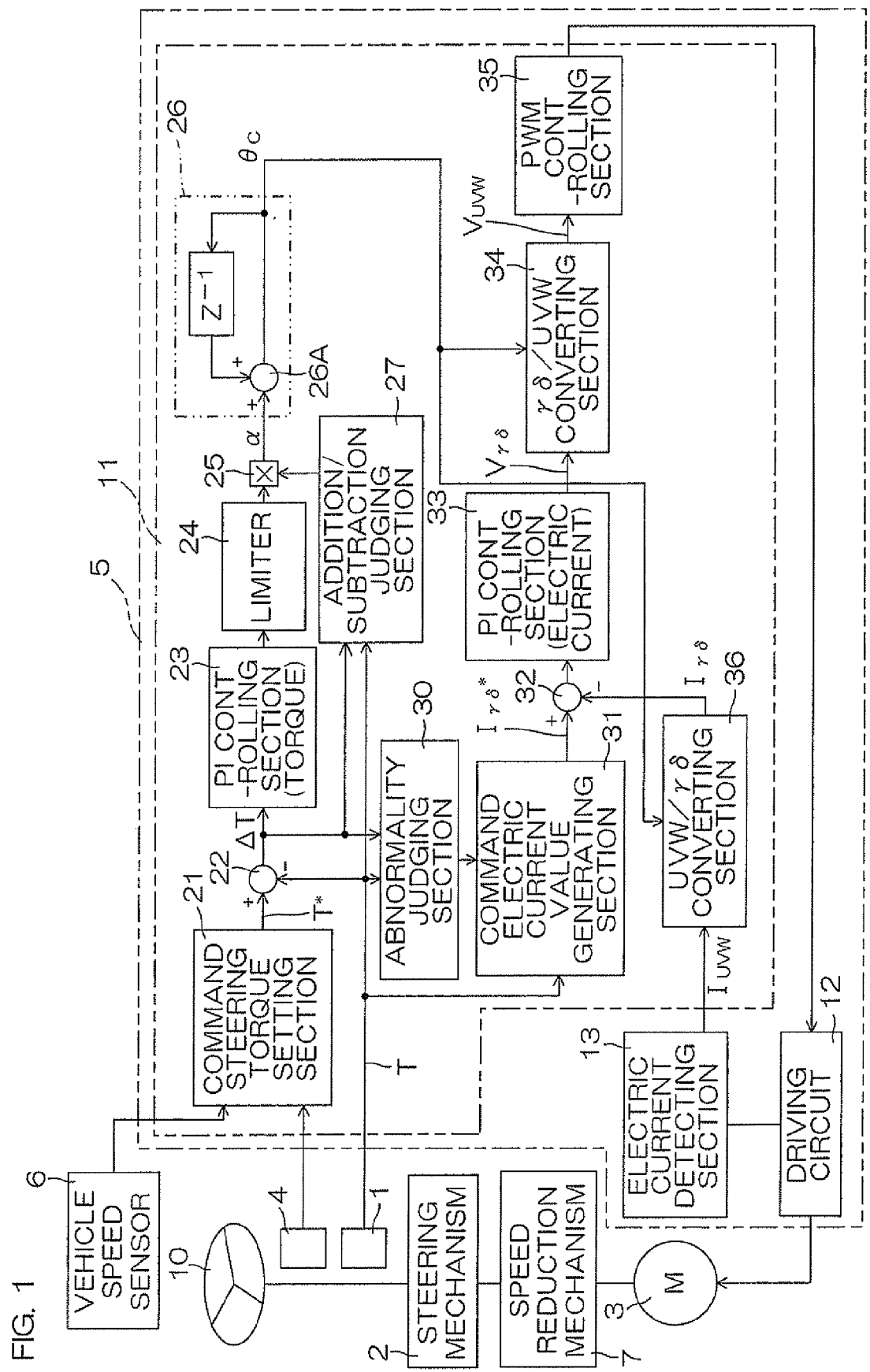
FIG. 1 is a block diagram for explaining the electrical configuration of an electric power steering apparatus employing a motor controller according to one embodiment of the present invention.

FIG. 1 is a block diagram for explaining the electrical configuration of an electric power steering apparatus (exemplary vehicle steering apparatus) employing a motor controller according to one embodiment of the present invention. The electric power steering apparatus includes a torque sensor 1 which detects a steering torque T applied to a steering wheel 10 (operation member) operable for steering the motor vehicle, a motor 3 (brushless motor) which applies a steering assist force to a steering mechanism 2 of a motor vehicle via a speed reduction mechanism 7, a steering angle sensor 4 which detects a steering angle that is a rotation angle of the steering wheel 10, a motor controller 5 which controls the driving of the motor 3, and a vehicle speed sensor 6 which detects the speed of the motor vehicle mounted with the electric power steering apparatus.

The motor controller 5 drives the motor 3 according to the steering torque detected by the torque sensor 1, the steering angle detected by the steering angle sensor 4 and the vehicle speed detected by the vehicle speed sensor 6, thereby properly performing a steering assist operation according to the steering state and the vehicle speed.

Figure 2:
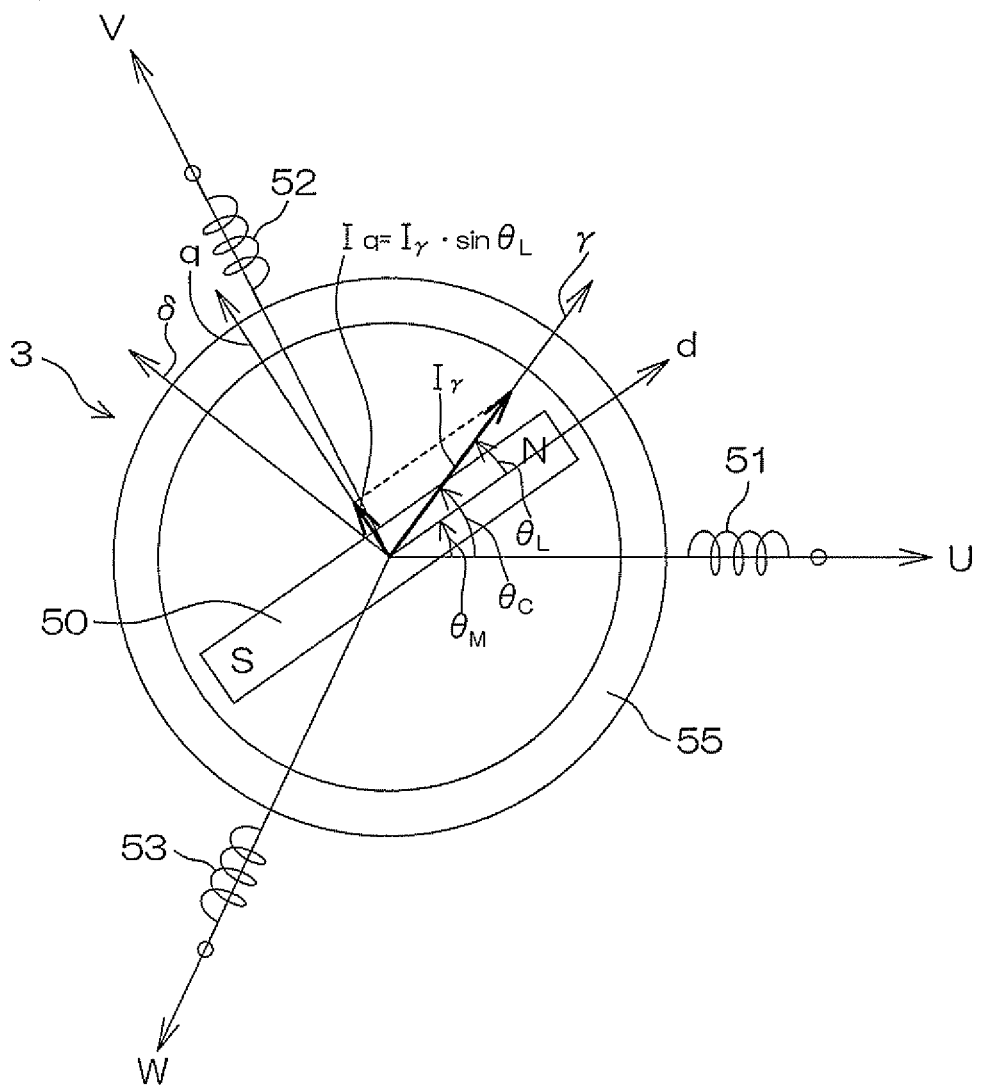
FIG. 2 is a schematic diagram for explaining the structure of a motor.

In this embodiment, the motor 3 is a three-phase brushless motor. As schematically illustrated in FIG. 2, the motor 3 includes a rotor 50 that serves as a field magnet, and U-phase, V-phase and W-phase stator coils 51, 52, 53 provided on a stator 55 opposed to the rotor 50. The motor 3 may be of an inner rotor type in which a stator is disposed on an outer side of a rotor in opposed relation to the rotor, or of an outer rotor type in which a stator is disposed on an inner side of a tubular rotor in opposed relation to the rotor.

A three-phase stationary coordinate system (UVW coordinate system) is defined, which includes a U-axis, a V-axis and a W-axis respectively extending along the U-phase, V-phase and W-phase stator coils 51, 52, 53. Further, a two-phase rotating coordinate system (dg coordinate system or actual rotating coordinate system) is defined, which includes a d-axis (magnetic pole axis) extending through magnetic poles of the rotor 50 and a q-axis (torque axis) extending perpendicularly to the d-axis within the rotational plane of the rotor 50. The dq coordinate system is a rotating coordinate system which rotates together with the rotor 50. In the dq coordinate system, only a q-axis electric current serves for torque generation by the rotor 50. Therefore, the q-axis electric current is controlled according to a desired torque with a d-axis electric current kept at zero. The rotation angle (rotor angle) $\theta_M$ of the rotor 50 is a rotation angle of the d—axis with respect to the U-axis. The dq coordinate system is an actual rotating coordinate system defined with respect to the rotor angle $\theta_M$. Coordinate conversion between the UVW coordinate system and the dq coordinate system can be performed with the use of the rotor angle $\theta_M$.

Further, this embodiment employs a control angle $\theta_C$ indicating a control rotor rotation angle. The control angle $\theta_C$ is a virtual rotation angle with respect to the U-axis. A virtual two-phase rotating coordinate system (γδ coordinate system or virtual rotating coordinate system) is defined, which includes a γ-axis serving as a virtual axis defined with respect to the control angle $\theta_C$ and a δ-axis advanced 90 degrees with respect to the γ-axis. Where the control angle $\theta_C$ is equal to the rotor angle $\theta_M$, the γδ coordinate system (virtual rotating coordinate system) coincides with the dq coordinate system (actual rotating coordinate system). That is, the virtual γ-axis coincides with the actual d-axis, and the virtual δ-axis coincides with the actual q-axis. The γδ coordinate system is a virtual rotating coordinate system defined with respect to the control angle $\theta_C$. Coordinate conversion between the UVW coordinate system and the γδ coordinate system is performed with the use of the control angle $\theta_C$.

A difference between the control angle $\theta_C$ and the rotor angle $\theta_M$ is defined as a load angle $\theta_L$ ($=\theta_C-\theta_M$).

When a γ-axis electric current $I_\gamma$ is supplied to the motor 3 based on the control angle $\theta_C$, a q-axis component of the γ-axis electric current $I_\gamma$ (orthogonal projection to the q-axis) serves as a q-axis electric current $I_q$ contributory to the torque generation by the rotor 50. That is, a relationship represented by the following expression (1) is established between the γ-axis electric current $I_\gamma$ and the q-axis electric current $I_q$:

$$I_q = I_\gamma \sin \theta_L \quad (1)$$

Referring again to FIG. 1, the motor controller 5 includes a microcomputer 11, a driving circuit (invertor circuit) 12 controlled by the microcomputer 11 for supplying an electric power to the motor 3, and an electric current detecting section 13 which detects electric currents flowing through the stator coils of the respective phases of the motor 3.

The electric current detecting section 13 detects phase electric currents $I_U$, $I_V$, $I_W$ (hereinafter referred to as "three-phase detection electric currents $I_{UVW}$" when being collectively designated) flowing through the respective phase stator coils 51, 52, 53 of the motor 3. These are electric currents flowing along the respective coordinate axes of the UVW coordinate system.

The microcomputer 11 includes a CPU and memories (a ROM, a RAM and the like), and executes predetermined programs to function as a plurality of functional sections. The functional sections include a command steering torque setting section 21, a torque deviation computing section 22, a PI (proportional integration controlling section 23, a limiter 24, an addition/subtraction factor multiplying section 25, a control angle computing section 26, an addition/subtraction judging section 27, an abnormality judging section 30, a command electric current value generating section 31, an electric current deviation computing section 32, a PI controlling section 33, a γδ/UVW converting section 34, a PWM (Pulse Width Modulation) controlling section 35, and a UVW/γδ converting section 36.

Figure 4:
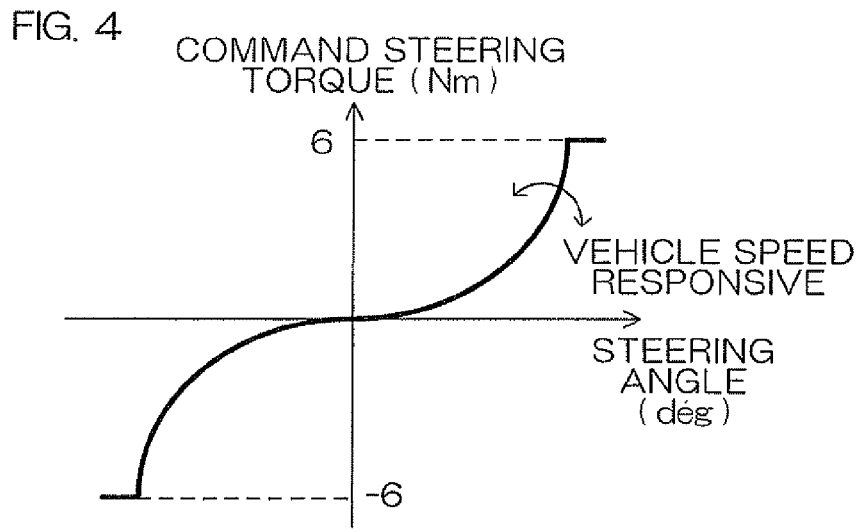
FIG. 4 is a diagram showing an exemplary characteristic of a command steering torque with respect a steering angle.

The command steering torque setting section 21 sets a command steering torque T* based on the steering angle detected by the steering sensor 4 and the vehicle speed detected by the vehicle speed sensor 6. As shown in FIG. 4, where the steering angle has a positive value (with the steering wheel turned right), the command steering torque T* is set at a positive value (indicating a rightward torque). Where the steering angle has a negative value (with the steering wheel turned left), the command steering torque T* is set at a negative value (indicating a leftward torque). The command steering torque T* is set as having an absolute value that is increased as the absolute value of the steering angle increases (an absolute value that is increased nonlinearly in FIG. 4). However, the command steering torque T* is set within a range between a predetermined upper limit (a positive value such as +6 Nm) and a predetermined lower limit (a negative value such as −6 Nm). The command steering torque T* is set as having an absolute value that is reduced as the vehicle speed increases. That is, a vehicle speed responsive control operation is performed.

The torque deviation computing section 22 computes a deviation (torque deviation) ΔT of the steering torque T detected by the torque sensor 1 (hereinafter referred to as "detection steering torque T" for distinction) from the command steering torque T* set by the command steering torque setting section 21. The PI controlling section 23 performs a PI computation on the torque deviation ΔT. That is, the torque deviation computing section 22 and the PI controlling section 23 collectively define a torque feedback controlling unit for approximating the detection steering torque T to the command steering torque T*. The PI controlling section 23 performs the PI computation on the torque deviation ΔT to compute an addition angle α to be added to the control angle $\theta_C$.

The limiter 24 is a limiting unit which limits the addition angle α computed by the PI controlling section 23. More specifically, the limiter 24 limits the addition angle α to a value between a predetermined upper limit UL (positive value) and a predetermined lower limit LL (negative value).

The addition/subtraction factor multiplying section 25 multiplies the addition angle α by an addition factor +1 or a subtraction factor −1. The addition angle α multiplied by the addition factor or the subtraction factor is added to a previous value $\theta_C(n-1)$ of the control angle $\theta_C$ (n is a current computing cycle number) by an adder 26A of the control angle computing section 26 ($Z^{-1}$ is a previous value of the signal). When the addition angle α is multiplied by the addition factor +1, the current value of the control angle $\theta_C$ is $\theta_C(n)=\theta_C(n-1)+\alpha$. On the other hand, when the addition angle α is multiplied by the subtraction factor −1, the current value of the control angle $\theta_C$ is $\theta_C(n)=\theta_C(n-1)-\alpha$. The initial value of the control angle $\theta_C$ is a predetermined value (e.g., zero).

The control angle computing section 26 includes the adder 26A which adds the addition angle α applied from the addition/subtraction factor multiplying section 25 to the previous value $\theta_C(n-1)$ of the control angle $\theta_C$. That is, the control angle computing section 26 computes the control angle $\theta_C$ in each predetermined computing cycle. The current value $\theta_C(n)$ of the control angle $\theta_C$ is determined in the current computing cycle based on the previous value $\theta_C(n-1)$ of the control angle $\theta_C$ determined in the preceding computing cycle.

The addition/subtraction judging section 27 judges whether the addition factor +1 or the subtraction factor −1 is to be employed as the factor for the multiplication of the addition angle α in the addition/subtraction factor multiplying section 25. More specifically, the addition/subtraction judging section 27 judges, based on the torque deviation ΔT computed by the torque deviation computing section 22 and a time-differential value T' of the detection steering torque T (steering torque differential value), whether the factor currently used in the addition/subtraction factor multiplying section 25 is to be maintained or to be sign-inverted between the addition factor +1 and the subtraction factor −1. Then, the addition/subtraction judging section 27 selects one of the addition factor +1 and the subtraction factor −1 based on the result of the judgment, and sets the selected factor in the addition/subtraction multiplying section 25. A process to be performed by the addition/subtraction judging section 27 will be described later in detail.

The abnormality judging section 30 performs an abnormality judgment process based on the torque deviation ΔT computed by the torque deviation computing section 22 and the detection steering torque T detected by the torque sensor 1. The result of the abnormality judgment process is applied to the command electric current value generating section 31. If the abnormality judging section 30 determines that the abnormality occurs, the command electric current value generating section 31 sets the command electric current value at a predetermined constant value (e.g., zero).

The command electric current value generating section 31 generates command electric current values of electric currents to be respectively supplied to the coordinate axes (virtual axes) of the γδ coordinate system which is the virtual rotating coordinate system defined with respect to the control angle $\theta_C$ (control rotation angle). More specifically, the command electric current value generating section 31 generates a γ-axis command electric current value $I_\gamma^*$ and a δ-axis command electric current value $I_\delta^*$ (hereinafter referred to as "two-phase command electric current values $I_{\gamma\delta}^*$" when being collectively designated). The command electric current value generating section 31 sets the γ-axis command electric current value $I_\gamma^*$ at a significant value, and sets the δ-axis command electric current value $I_\delta^*$ at zero. More specifically, the command electric current value generating section 31 sets the γ-axis command electric current value $I_\gamma^*$ based on the detection steering torque T detected by the torque sensor 1.

Figure 5:
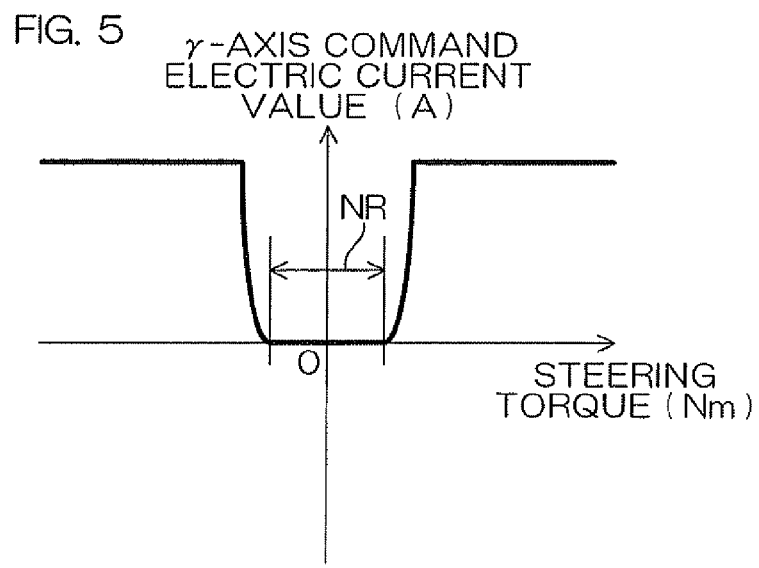
FIG. 5 is a diagram showing an exemplary setting of a γ-axis command electric current value.

An exemplary setting of the γ-axis command electric current value $I_\gamma^*$ for the detection steering torque T is shown in FIG. 5. A dead zone NR is defined around a detection steering torque T of zero. The γ-axis command electric current value $I_\gamma^*$ is steeply increased outside the dead zone NR, and kept at a substantially constant value that is not less than a predetermined torque value. Thus, power supply to the motor 3 is stopped to suppress unnecessary power consumption when the driver does not operate the steering wheel 10.

The electric current deviation computing section 32 computes a deviation $I_\gamma^*-I_\gamma$ of the γ-axis detection electric current $I_\gamma$ from the γ-axis command electric current value $I_\gamma^*$ generated by the command electric current value generating section 31, and a deviation $I_\delta^*-I_\delta$ of the δ-axis detection electric current $I_\delta$ from the δ-axis command electric current value $I_\delta^*$ (=0). The γ-axis detection electric current $I_\gamma$ and the δ-axis detection electric current $I_\delta$ are applied to the deviation computing section 32 from the UVW/γδ converting section 36.

The UVW/γδ converting section 36 converts the three-phase detection electric currents $I_{UVW}$ (including the U-phase detection electric current $I_U$, the V-phase detection electric current $I_V$ and the W-phase detection electric current $I_W$) detected by the electric current detecting section 13 in the UVW coordinate system into two-phase detection electric currents $I_\gamma$, $I_\delta$ (hereinafter referred to as "two-phase detection electric currents $I_{\gamma\delta}$ when being collectively designated) in the $\gamma\delta$ coordinate system. The two-phase detection electric currents $I_\gamma$, $I_\delta$ are applied to the electric current deviation computing section 32. The coordinate conversion performed in the UVW/$\gamma\delta$ converting section 36 is based on the control angle $\theta_C$ computed by the control angle computing section 26.

The PI controlling section 33 generates two-phase command voltages $V_{\gamma\delta}$ (including a $\gamma$-axis command voltage $V_\gamma$ and a $\delta$-axis command voltage $V_\delta$) to be applied to the motor 3 by performing a PI computation on the electric current deviation computed by the electric current deviation computing section 32. The two-phase command voltages $V_{\gamma\delta}$ are applied to the $\gamma\delta$/UVW converting section 34.

The $\gamma\delta$/UVW converting section 34 generates three-phase command voltages $V_{UVW}$ by performing a coordinate converting computation on the two-phase command voltages $V_{\gamma\delta}$. The three-phase command voltages $V_{UVW}$ include a U-phase command voltage $V_U$, a V-phase command voltage $V_V$ and a W-phase command voltage $V_W$. The three-phase command voltages $V_{UVW}$ are applied to the PWM controlling section 35.

The PWM controlling section 35 generates a U-phase PWM control signal, a V-phase PWM control signal and a W-phase PWM control signal at duty ratios for the U-phase command voltage $V_U$, the V-phase command voltage $V_V$ and the W-phase command voltage $V_W$, and supplies these PWM control signals to the driving circuit 12.

The driving circuit 12 includes three-phase invertor circuits for the U-phase, the V-phase and the W-phase. Power devices of the respective invertor circuits are controlled by the PWM control signals applied from the PWM control section 35, whereby voltages corresponding to the three-phase command voltages $V_{UVW}$ are applied to the respective phase stator coils 51, 52, 53 of the motor 3.

The electric current deviation computing section 32 and the PI controlling section 33 collectively define an electric current feedback controlling unit. By the function of the electric current feedback controlling unit, the motor electric currents flowing in the motor 3 are controlled to be approximated to the two-phase command electric current values $I_{\gamma\delta}^*$ set by the command electric current value generating section 31.

Figure 3:
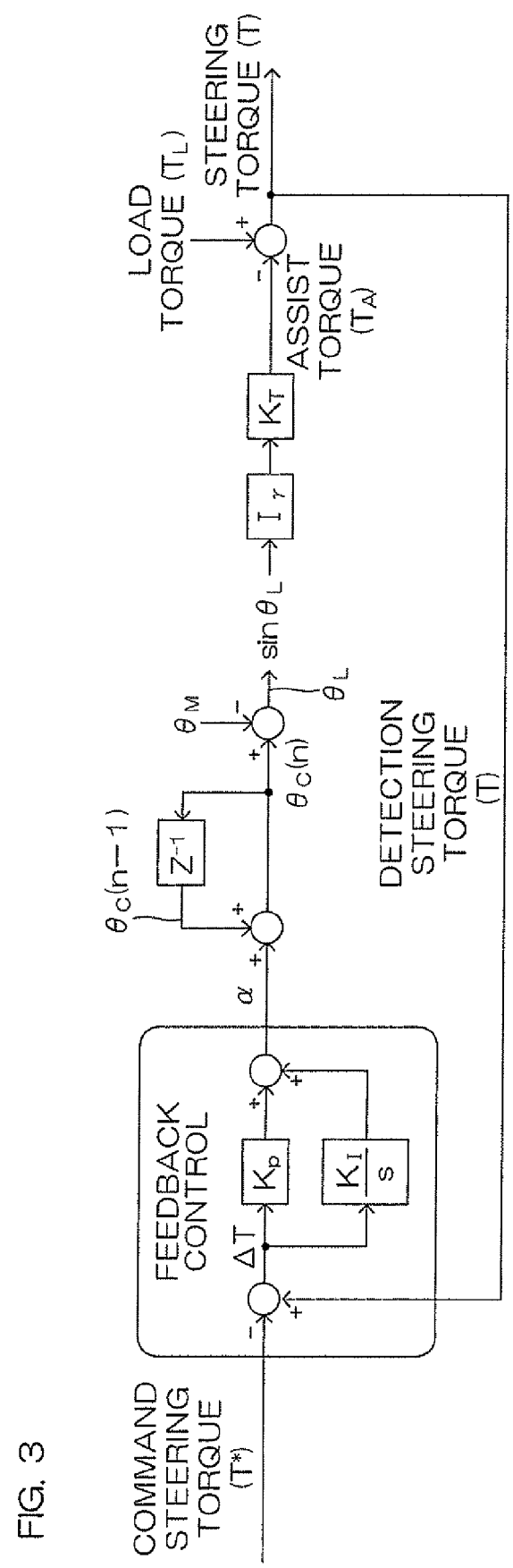
FIG. 3 is a control block diagram of the electric power steering apparatus.

FIG. 3 is a control block diagram of the electric power steering apparatus. For simplification of explanation, the functions of the limiter 24 and the addition/subtraction factor multiplying section 25 are not shown.

The addition angle $\alpha$ is generated by performing the PI control ($K_P$ is a proportionality factor, $K_I$ is an integration factor, and 1/s is a integration operator) on the deviation (torque deviation) of the detection steering torque T from the command steering torque T*. The current value $\theta_C(n)=\theta_C(n-1)+\alpha$ of the control angle $\theta_C$ is computed by adding the addition angle $\alpha$ to the previous value $\theta_C(n-1)$ of the control angle $\theta_C$. At this time, a difference between the actual rotor angle $\theta_M$ of the rotor 50 and the control angle $\theta_C$ is employed as the load angle $\theta_L=\theta_C-\theta_M$.

Therefore, when the $\gamma$-axis electric current $I_\gamma$ is supplied to the $\gamma$-axis (virtual axis) of the $\gamma\delta$ coordinate system (virtual rotating coordinate system) defined with respect to the control angle $\theta_C$ according to the $\gamma$-axis command electric current value $I_\gamma^*$, the q-axis electric current $I_q$ becomes $I_q=I_\gamma \sin\theta_L$. The q-axis electric current $I_q$ is contributory to the torque generation by the rotor 50. That is, an assist torque $T_A$ ($=K_T \cdot I_\gamma \sin\theta_L$), which is determined by multiplying the q-axis electric current $I_q$ ($=I_\gamma \sin\theta_L$) by a torque constant $K_T$ of the motor 3, is transmitted to the steering mechanism 2 via the speed reduction mechanism 7. A value calculated by subtracting the assist torque $T_A$ from the load torque $T_L$ applied from the steering mechanism 2 is the steering torque T to be applied to the steering wheel 10 by the driver. The feedback of the steering torque T makes it possible to approximate the steering torque T to the command steering torque T*. That is, the addition angle $\alpha$ is computed so that the detection steering torque T is equal to the command steering torque T*, and the control angle $\theta_C$ is controlled based on the addition angle $\alpha$.

The load angle $\theta_L$ is changed by thus updating the control angle $\theta_C$ with the use of the addition angle $\alpha$ determined based on the deviation $\Delta T$ of the detection steering torque T from the command steering torque T* while causing the electric current to flow along the $\gamma$-axis (virtual axis for the control). Then, the motor 3 generates the torque according to the load angle $\theta_L$. Since the motor 3 can generate the torque according to the command steering torque T* determined based on the steering angle and the vehicle speed, the steering assist force can be properly applied to the steering mechanism 2 according to the steering angle and the vehicle speed. That is, the steering assist controlling operation is performed so that the steering torque is increased as the absolute value of the steering angle increases, and the steering torque is reduced as the vehicle speed increases.

Thus, the electric power steering apparatus can properly perform the steering assist operation by properly controlling the motor 3 without the use of the rotation angle sensor. This simplifies the construction, and reduces the costs.

Figure 6:
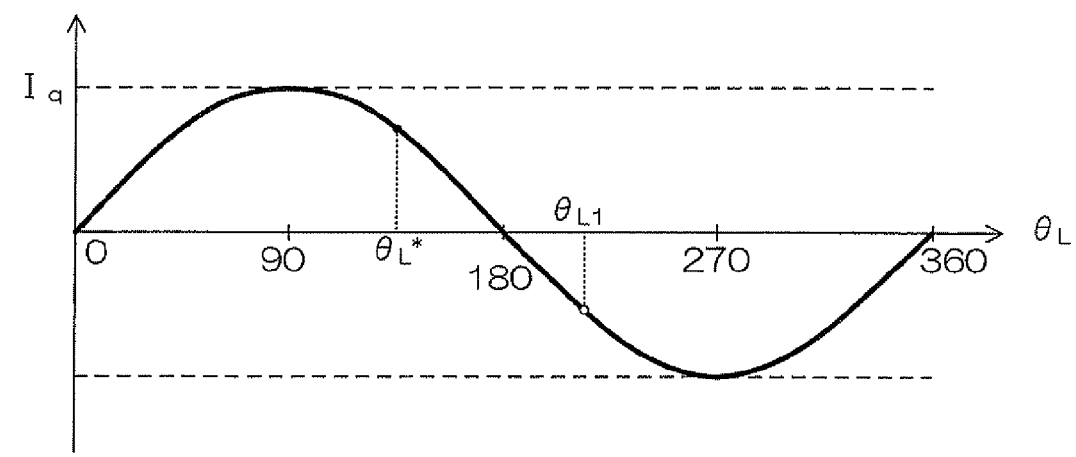
FIG. 6 is an explanatory diagram for explaining the functions of an addition/subtraction judging section and an addition/subtraction factor multiplying section.

FIG. 6 is an explanatory diagram for explaining the functions of the addition/subtraction judging section 27 and the addition/subtraction factor multiplying section 25, illustrating a relationship between the load angle $\theta_L$ and the q-axis electric current $I_q$. The q-axis electric current $I_q$ is given by $I_q=I_\gamma \sin\theta_L$ ($\theta_L=\theta_C-\theta_M$) with the use of the load angle $\theta_L$. Therefore, the change in the q-axis electric current $I_q$ with respect to the load angle $\theta_L$ is such that the q-axis electric current $I_q$ monotonically increases in ranges of 0 degrees$\leq\theta_L<$90 degrees and 270 degrees$\leq\theta_L<$360 degrees and monotonically decreases in a range of 90 degrees$\leq\theta_L<$270 degrees.

On the other hand, the PI controlling section 23 is operative to generate a positive addition angle $\alpha$ if the deviation $\Delta T$ of the detection steering torque T from the command steering torque T* has a positive value, and generates a negative addition angle $\alpha$ if the deviation $\Delta T$ has a negative value.

It is herein assumed, for example, that a target load angle $\theta_L^*$ for the command steering torque T* (a load angle that provides a target q-axis electric current for the command steering torque T*) is slightly greater than 90 degrees and the current load angle $\theta_{L1}$ is slightly greater than 180 degrees, so that both the target load angle $\theta_L^*$ and the current load angle $\theta_{L1}$ fall within the monotonously decreasing range (90 degrees$\leq\theta_L<$270 degrees) as shown in FIG. 6. In this case, the current load angle $\theta_L$ can be more rapidly approximated to the target load angle $\theta_L^*$ by reducing the load angle $\theta_L$ rather than increasing the load angle $\theta_L$. That is, the time required for reaching the target q-axis electric current is reduced by employing a positive addition angle $\alpha$ rather than a negative addition angle $\alpha$.

Therefore, the addition/subtraction judging section 27 determines an addition/subtraction factor to determine the sign of the addition angle $\alpha$ to ensure that the target load angle $\theta_L^*$ is more rapidly reached. Then, the addition/subtraction factor is applied to the addition/subtraction multiplying section 25.

Figure 7:
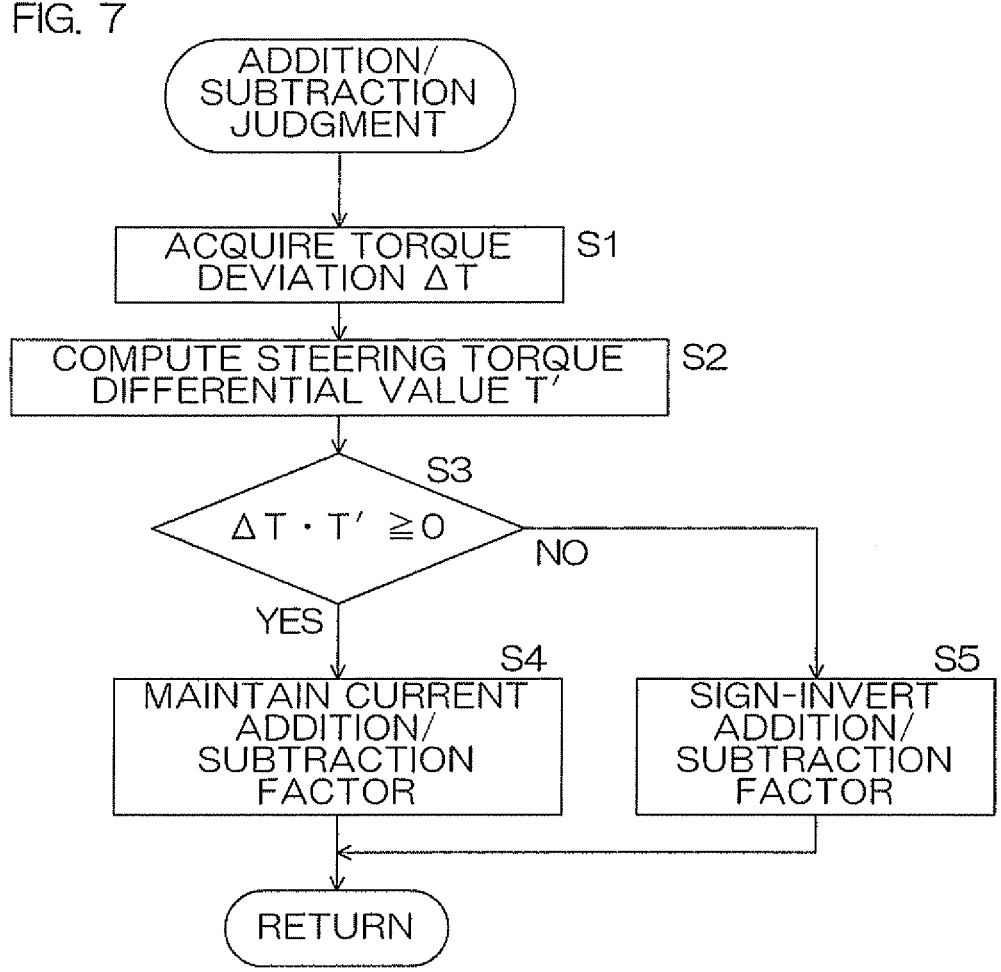
FIG. 7 is a flow chart for explaining a process to be performed by the addition/subtraction judging section.

More specifically, as shown in FIG. 7, the addition/subtraction judging section 27 acquires the deviation (torque deviation) $\Delta T$ of the detection steering torque T from the command steering torque T* from the torque deviation computing section 22 (Step S1). Further, the addition/subtraction judging section 27 determines the steering torque differential value T' which is the time-differential value of the detection steering torque T (Step S2). Then, the addition/subtraction judging section 27 multiplies the torque deviation $\Delta T$ by the steering torque differential value T', and checks the sign of the resulting product (Step S3). If the product $\Delta T \cdot T'$ is positive or zero (YES in Step S3), the addition/subtraction factor currently used is maintained (Step S4). On the other hand, if the product $\Delta T \cdot T'$ is negative (NO in Step S3), the addition/subtraction factor is sign-inverted (Step S5). That is, an addition/subtraction factor having a sign different from that of the current addition/subtraction factor is set in the addition/subtraction factor multiplying section 25. The initial value of the addition/subtraction factor may be, for example, a positive value +1.

If the detection steering torque T tends to increase (i.e., the steering torque differential value T' is positive) when the torque deviation $\Delta T$ is positive, the detection steering torque T can be approximated to the command steering torque T*. Therefore, if the product $\Delta T \cdot T'$ is positive, the detection steering torque T can be rapidly approximated to the command steering torque T* by maintaining the addition/subtraction factor currently set in the addition/subtraction factor multiplying section 25.

On the other hand, if the torque deviation $\Delta T$ is positive and the detection steering torque T tends to decrease (i.e., the steering torque differential value T' is negative), the product $\Delta T \cdot T'$ is negative. At this time, the detection steering torque T changes apart from the command steering torque T*. Therefore, the detection steering torque T can be rapidly approximated to the command steering torque T* by sign-inverting the addition/subtraction factor currently set in the addition/subtraction factor multiplying section 25.

If the detection steering torque T tends to decrease (i.e., the steering torque differential value T' is negative) when the torque deviation $\Delta T$ is negative, the detection steering torque T can be approximated to the command steering torque T*. Therefore, if the product $\Delta T \cdot T'$ is positive, the detection steering torque T can be rapidly approximated to the command steering torque T* by maintaining the addition/subtraction factor currently set in the addition/subtraction factor multiplying section 25.

On the other hand, if the torque deviation $\Delta T$ is negative and the detection steering torque T tends to increase (i.e., the steering torque differential value T' is positive), the product $\Delta T \cdot T'$ is negative. At this time, the detection steering torque T changes apart from the command steering torque T*. Therefore, the detection steering torque T can be rapidly approximated to the command steering torque T* by sign-inverting the addition/subtraction factor currently set in the addition/subtraction factor multiplying section 25.

Thus, the addition/subtraction factor currently used is maintained if the product $\Delta T \cdot T'$ is positive, and sign-inverted if the product $\Delta T \cdot T'$ is negative, whereby the detection steering torque T can be more rapidly approximated to the command steering torque T*.

Figure 8:
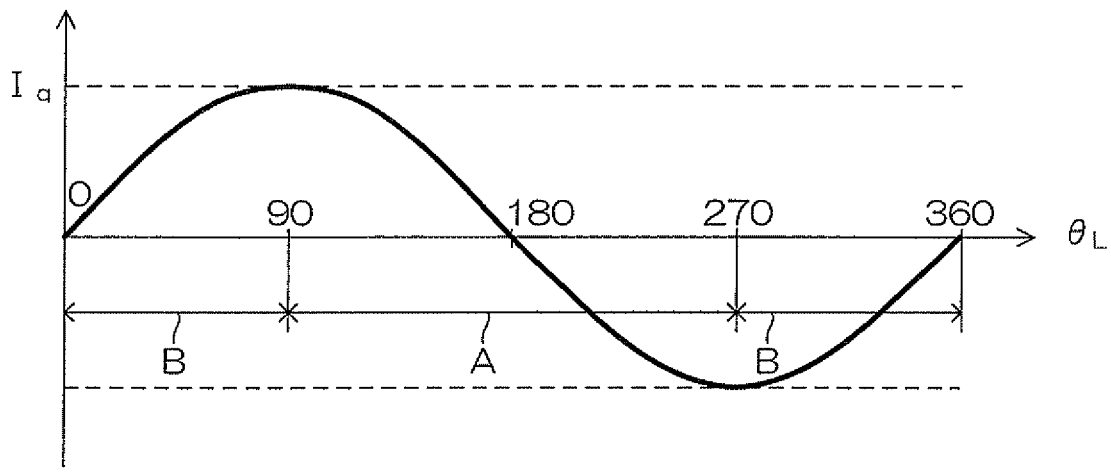
FIG. 8 is a diagram for explaining a control angle computing cycle.

FIG. 8 is a diagram for explaining the computing cycle for computing the control angle $\theta_C$, illustrating a relationship between the load angle $\theta_L$ and the q-axis electric current $I_q$. In order to reduce the computational load of the microcomputer 11 as much as possible, it is preferred to increase the computing cycle as much as possible. In this embodiment, therefore, the computing cycle is determined based on a maximum steering angular speed. The maximum steering angular speed is the possible highest level of the steering angular speed of the steering wheel 10, for example, about 800 deg/sec.

With the maximum steering angular speed, the change rate of the electric angle of the rotor 50 (electric angular speed or maximum rotor angular speed) is given by the following expression (2) as a product of the maximum steering angular speed, the reduction ratio of the speed reduction mechanism 7 and the number of polar pairs of the rotor 50. The number of polar pairs means the number of pairs of poles (N/S poles) of the rotor 50.

Maximum rotor angular speed=Maximum steering angular speed×Reduction ratio×Number of polar pairs  (2)

The maximum electric angle change amount of the rotor 50 (maximum rotor angle change amount) during the computation of the control angle $\theta_C$ (in the computing cycle) is a value calculated from the following expression (3) by multiplying the maximum rotor angular speed by the computing cycle:

Maximum rotor angle change amount=Maximum rotor angular speed×Control cycle=Maximum steering angular speed×Reduction ratio×Number of polar pairs×Control cycle  (3)

On the other hand, the full range (0 degree$\leq \theta_L <$360 degrees) of the load angle $\theta_L$ ($=\theta_C - \theta_M$) is divided into a monotonically decreasing range A in which the q-axis electric current $I_q$ monotonically decreases and a monotonically increasing range B in which the q-axis electric current $I_q$ monotonically increases. The monotonically decreasing range A is defined as a range of 90 degrees$\leq \theta_L <$270 degrees. The monotonically increasing range B is defined as ranges of 0 degree$\leq \theta_L <$90 degrees and 270 degrees$\leq \theta_L <$360 degrees. For proper feedback, the control operation should be continuously performed in the same range at least twice. For the control operation, the maximum rotor angle change amount is not greater than 90 degrees as indicated by the following expression (4):

Maximum rotor angle change amount$\leq$90 degrees  (4)

The above expression (3) is substituted in the expression (4), and the resulting expression is transformed to provide the following expression (5):

$$\text{Computing cycle} \leq \frac{90 \text{ degrees}}{\text{Maximum rotor angular speed}} = \frac{90 \text{ degrees}}{\text{Maximum steering angular speed} \times \text{Reduction ratio} \times \text{Number of polar pairs}} \quad (5)$$

Therefore, the computing cycle is determined so as to be equal to the value of the right term of the expression (5), thereby making it possible to properly control the motor 3 while increasing the computing cycle as much as possible to reduce the computational load of the microcomputer 11.

Figure 9:
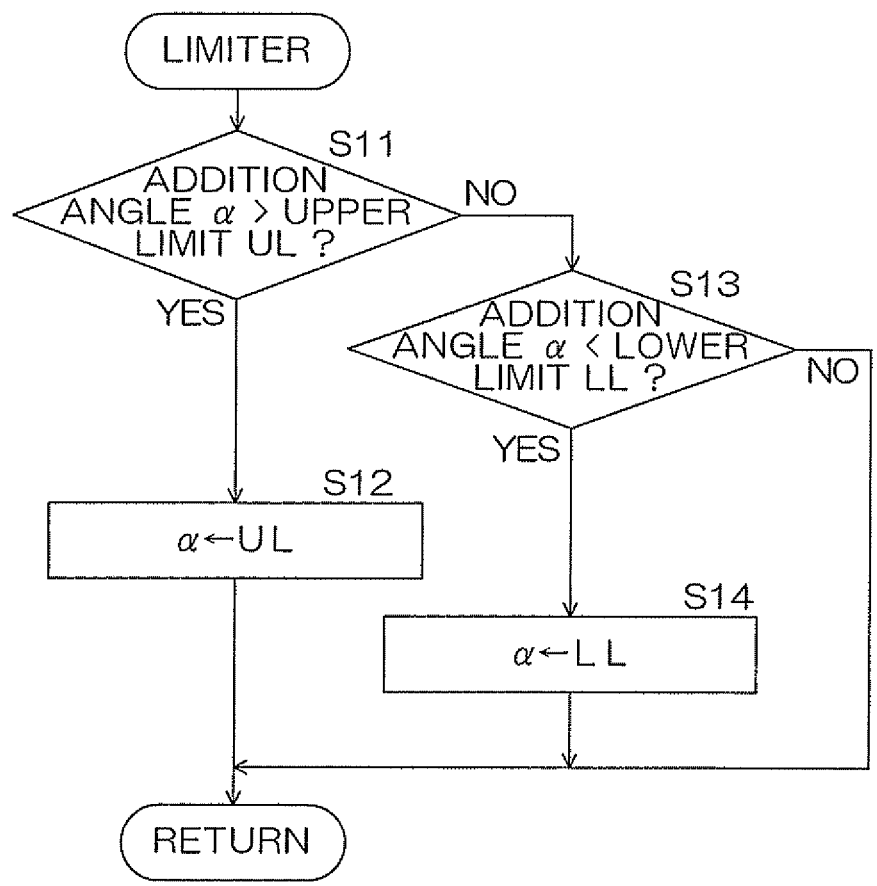
FIG. 9 is a flow chart for explaining the function of a limiter.

FIG. 9 is a flow chart for explaining the function of the limiter 24. The maximum electric angle change amount of the rotor 50 (maximum rotor angle change amount) during the computation of the control angle $\theta_C$ (in the computing cycle), which is given by the above expression (3), is the maximum change amount of the control angle $\theta_C$ allowable in each computing cycle. Therefore, where the maximum rotor angle change amount is expressed as $\omega_{max}$ (>0), an upper limit UL and a lower limit LL of the addition angle $\alpha$ are given by the following expressions (6) and (7):

$$UL = +\omega_{max} \quad (6)$$

$$LL = -\omega_{max} \quad (7)$$

The limiter 24 compares the addition angle $\alpha$ computed by the PI controlling section 23 with the upper limit UL (Step S11). If the addition angle $\alpha$ is greater than the upper limit UL (YES in Step S11), the upper limit UL is assigned to the addition angle $\alpha$ (Step S12). Therefore, the upper limit UL $(=+\omega_{max})$ is added to the control angle $\theta_C$.

If the addition angle $\alpha$ computed by the PI controlling section 23 is not greater than the upper limit UL (NO in Step S11), the limiter 24 further compares the addition angle $\alpha$ with the lower limit LL (Step S13). If the addition angle $\alpha$ is less than the lower limit (YES in Step S13), the lower limit LL is assigned to the addition angle $\alpha$ (Step S14). Therefore, the lower limit LL $(=-\omega_{max})$ is added to the control angle $\theta_C$.

If the addition angle $\alpha$ computed by the PI controlling section 23 is not less than the lower limit LL and not greater than the upper limit UL (NO in Step S13), the addition angle $\alpha$ is used as it is for the addition to the control angle $\theta_C$.

Thus, the addition angle $\alpha$ is limited between the upper limit UL and the lower limit LL, thereby stabilizing the control. More specifically, even if the control state is unstable (the assist force is unstable) due to shortage of the electric current or at the start of the control, the control state can be rapidly stabilized. This improves the steering feeling.

Figure 10:
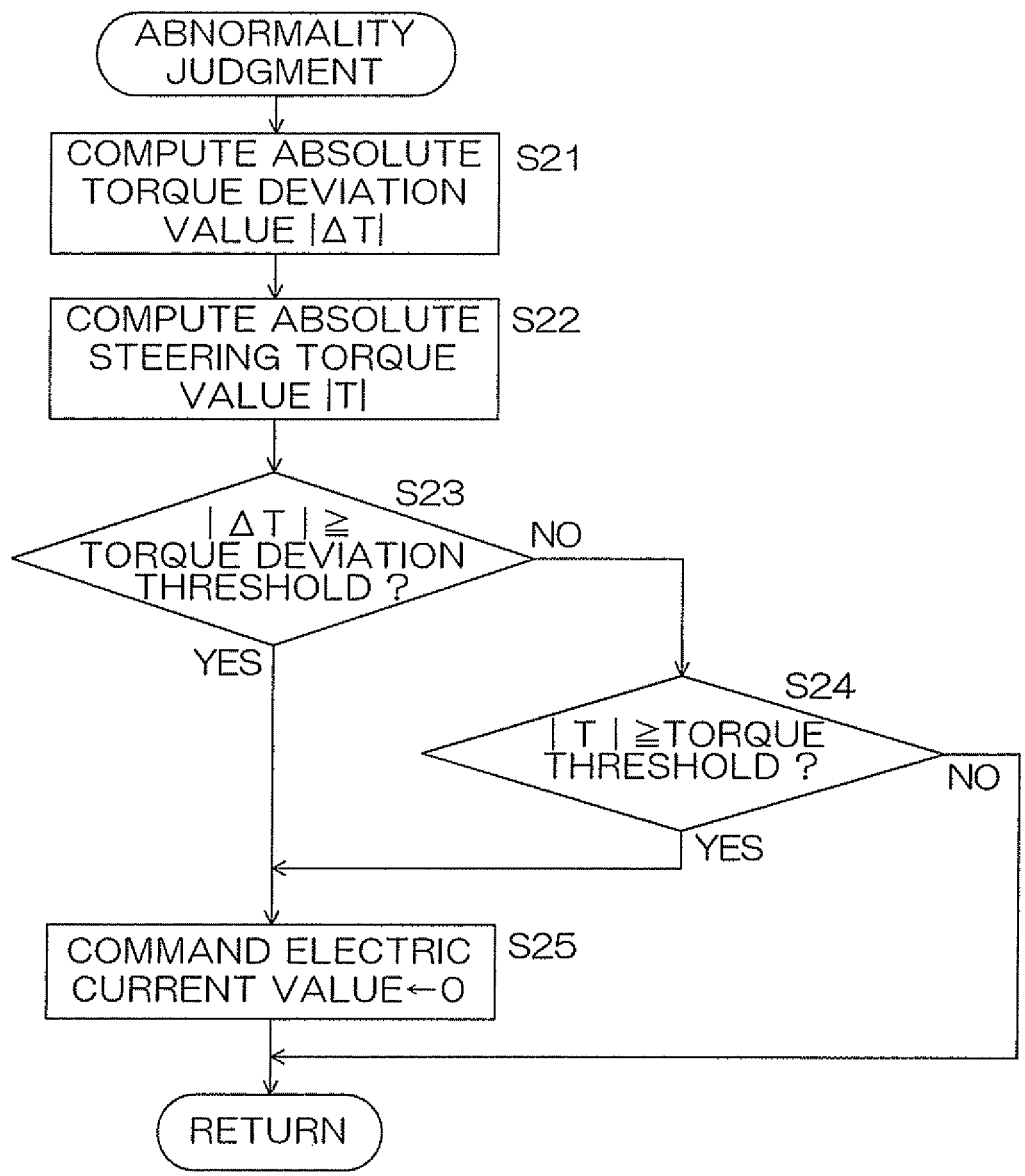
FIG. 10 is a flow chart for explaining a process to be performed by an abnormality judging section.

FIG. 10 is a flow chart for explaining a process to be performed by the abnormality judging section 30. First, the torque deviation $\Delta T$ ($=T^*-T$), which is the deviation of the detection steering torque T from the command steering torque $T^*$, is acquired from the torque deviation computing section 22, and the absolute value $|\Delta T|$ of the torque deviation is determined (Step S21).

Further, the absolute value $|T|$ of the detection steering torque T is determined (Step S22). Then, the absolute torque deviation value $|\Delta T|$ is compared with a torque deviation threshold (e.g., 2 Nm) (Step S23). If the absolute torque deviation value $|\Delta T|$ is less than the torque deviation threshold (NO in Step S23), the absolute detection steering torque value $|T|$ is compared with a torque threshold (e.g., 6 Nm) (Step S24). If the absolute detection steering torque value $|T|$ is less than the torque threshold (NO in Step S24), it is determined that no abnormality occurs.

On the other hand, if the absolute torque deviation value $|\Delta T|$ is equal to or greater than the torque deviation threshold (YES in Step S23), or if the absolute detection torque value $|T|$ is equal to or greater than the torque threshold (YES in Step S24), it is determined that the abnormality occurs. Then, the abnormality judging section 30 applies the information of the abnormality occurrence to the command electric current value generating section 31.

Upon reception of the information of the abnormality occurrence, the command electric current value generating section 31 sets the $\gamma$-axis command electric current value $I_\gamma^*$ at the predetermined constant value (zero in this embodiment) (Step S25). Thus, the motor electric current is controlled to be zero. This makes it possible to perform the steering operation (manual steering operation) by operating the steering wheel 10, while preventing the motor 3 from becoming a load.

In this manner, the occurrence of the abnormality is judged based on the absolute torque deviation value $|\Delta T|$ and the absolute detection steering torque value $|T|$. If the abnormality occurs, the $\gamma$-axis command electric current value $I_\gamma^*$ is set at zero to permit the manual steering operation. This additionally provides a fail-safe function for prevention of unstable control when the abnormality occurs.

Figure 11:
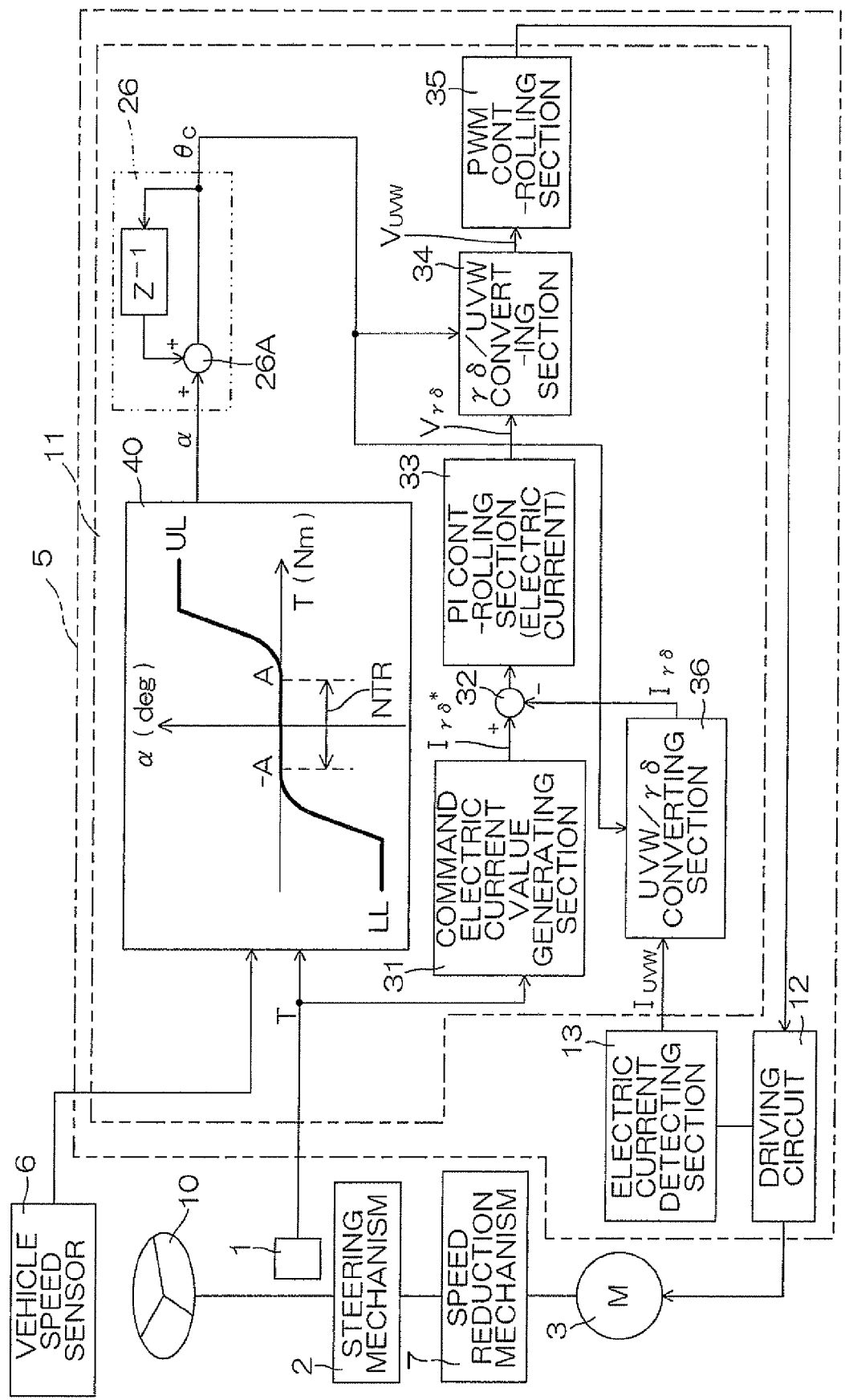
FIG. 11 is a block diagram for explaining the construction of an electric power steering apparatus according to another embodiment of the present invention.

FIG. 11 is a block diagram for explaining the construction of an electric power steering apparatus according to another embodiment of the present invention. In FIG. 11, components corresponding to those shown in FIG. 1 will be denoted by the same reference characters as in FIG. 1.

In this embodiment, an addition angle computing section 40 which computes the addition angle $\alpha$ based on the steering torque T detected by the torque sensor 1 is provided as a functional section of the microcomputer 11. The addition angle computing section 40 may include a map which predefines the characteristics of the addition angle $\alpha$ with respect to the detection steering torque T.

The addition angle $\alpha$ is set at zero, for example, for a detection steering torque T falling within a predetermined torque dead zone NTR ($-A \leq T \leq A$, wherein A is a constant and A>0). For a positive detection steering torque T falling outside the torque dead zone NTR, the addition angle $\alpha$ is set at a positive value for a positive detection steering torque T falling outside the torque dead zone NTR. Further, the addition angle $\alpha$ is not greater than a predetermined upper limit UL, and is increased as the detection steering torque T increases. For a negative steering torque T falling outside the torque dead zone NTR, the addition angle $\alpha$ is set at a negative value. The absolute value of the negative, addition angle $\alpha$ is increased as the absolute value of the steering torque T increases. However, the addition angle $\alpha$ is not less than a predetermined lower limit LL.

With this arrangement, the addition angle $\alpha$ determined according to the steering torque T is added to the control angle $\theta_C$ in each computing cycle. As a result, a load angle $\theta_L$ is set according to the steering angle T. Thus, the motor 3 properly generates the steering assist force, which is in turn transmitted to the steering mechanism 2 via the speed reduction mechanism 7. In the case of the electric power steering apparatus, the torque to be generated by the motor 3 corresponds to the steering torque T. Therefore, the motor 3 can generate the torque as desired by setting the addition angle $\alpha$ based on the steering torque T.

Figure 12:
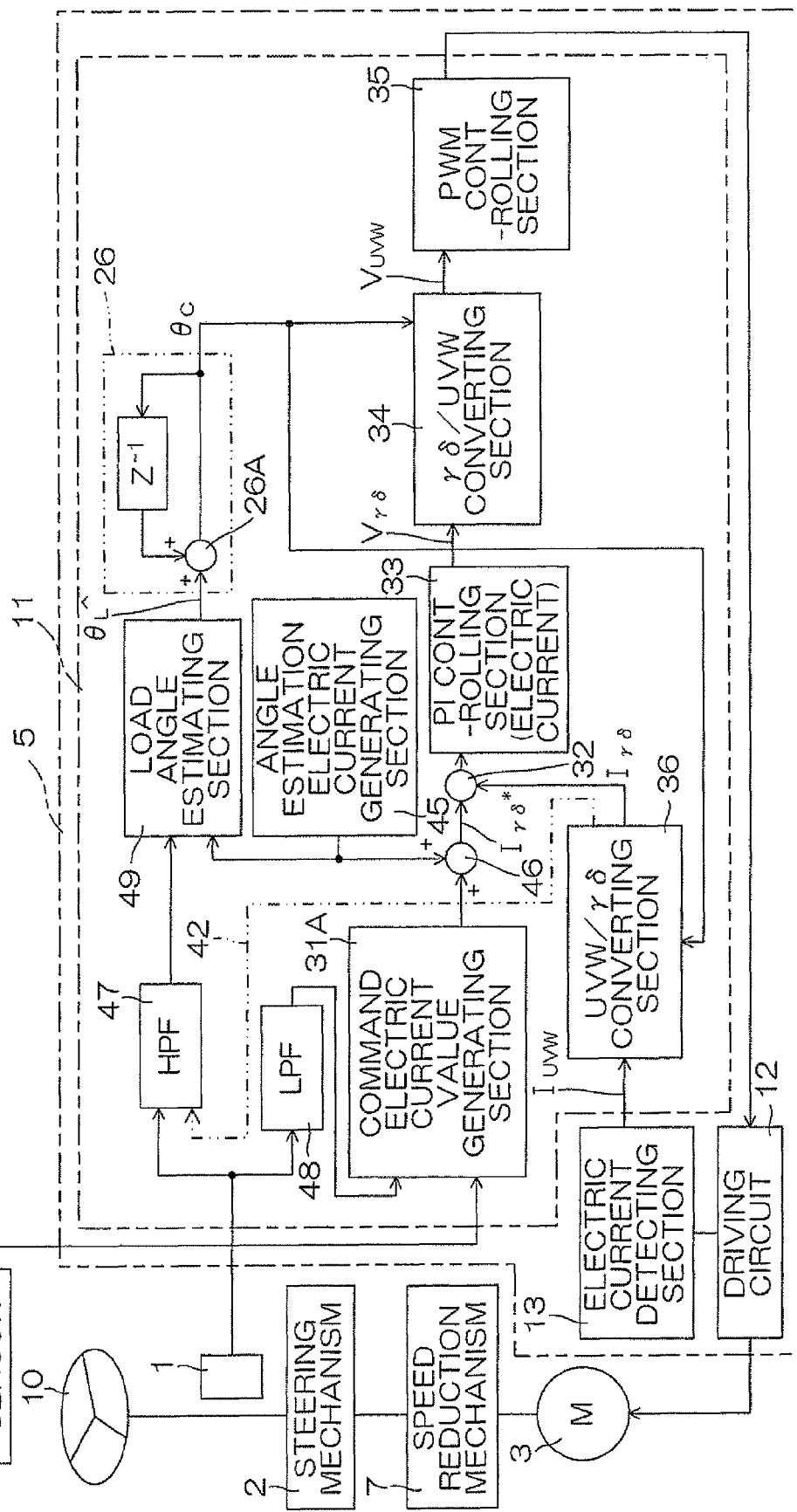
FIG. 12 is a block diagram for explaining the construction of a motor controller according to further another embodiment of the present invention.
Figure 13:
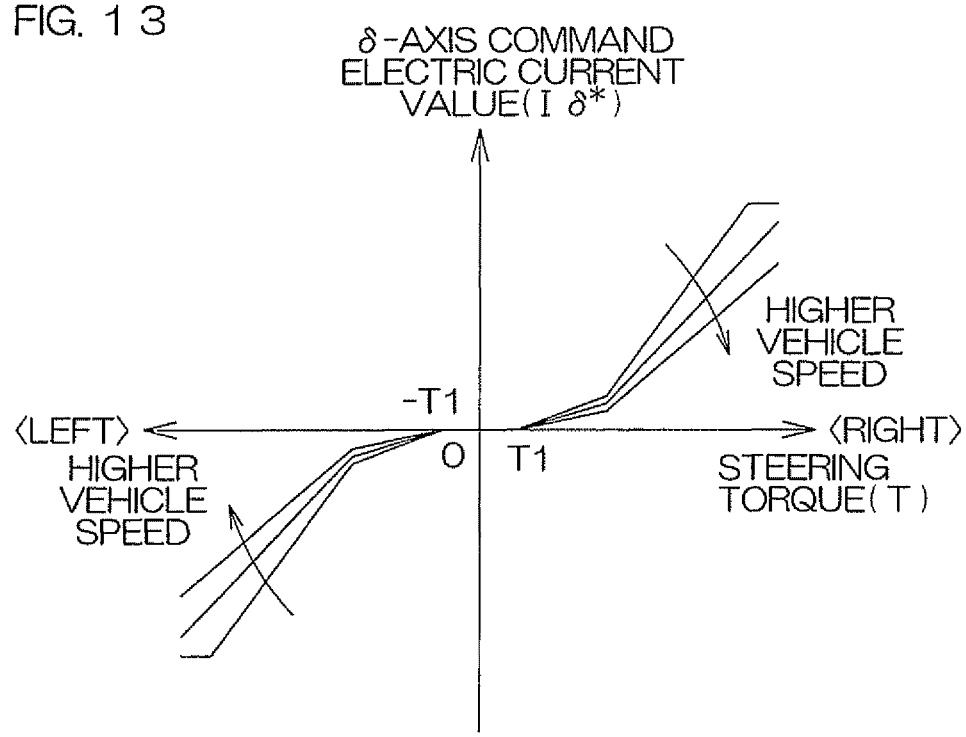
FIG. 13 is a diagram showing an exemplary setting of a δ-axis command electric current value in the embodiment of FIG. 12.

FIG. 12 is a block diagram for explaining the construction of a motor controller according to further another embodiment of the present invention. In FIG. 12, components corresponding to those shown in FIG. 1 will be denoted by the same reference characters as in FIG. 1.

In this embodiment, a command electric current value generating section 31A generates a $\delta$-axis command electric current value $I_\delta^*$ based on the steering torque T detected by the torque sensor 1 and the vehicle speed detected by the vehicle speed sensor 6 while generating a $\gamma$-axis command electric current value of $I_\gamma^*=0$. The $\delta$-axis command electric current value $I_\delta^*$ corresponds to an assist torque to be generated by the motor 3.

The $\delta$-axis command electric current value $I_\delta^*$ is positive, for example, when the steering assist force is to be generated by the motor 3 for rightward steering. The $\delta$-axis command electric current value $I_\delta^*$ is negative, when the steering assist force is to be generated by the motor 3 for leftward steering.

The $\delta$-axis command electric current value $I_\delta^*$ is positive for a positive steering torque T (a torque for the rightward steering), and is negative for a negative steering torque T (a torque for the leftward steering). When the steering torque T has a very small value falling within a range (torque dead zone) of $-T1$ to $T1$ (e.g., $T1=0.4$ N·m), the $\delta$-axis command electric current value $I_δ*$ is set at zero. Outside the torque dead zone, the δ-axis command electric current value $I_δ*$ is determined within a range between a predetermined lower limit and a predetermined upper limit so that the absolute value thereof is increased as the absolute value of the steering torque T increases. Further, the δ-axis command electric current value $I_δ*$ is determined so that the absolute value thereof is reduced as the vehicle speed detected by the vehicle speed sensor 6 increases. Thus, a greater steering assist force is generated during lower speed traveling, and a smaller steering assist force is generated during higher speed traveling.

In this embodiment, the microcomputer 11 includes, as functional sections, an angle estimation electric current generating section 45, an electric current superposing section 46, a high-pass filter (HPF) 47, a low-pass filter (LPF) 48 and a load angle estimating section 49.

The angle estimation electric current generating section 45 generates an estimation electric current value for estimation of a load angle $θ_L$. The estimation electric current value is the value of a high-frequency electric current having a frequency not less than the maximum frequency of a load torque applied from the steering mechanism 2. The estimation electric current value is superposed on the δ-axis command electric current value $I_δ*$ in the electric current superposing section 46. The δ-axis command electric current value $I_δ*$ superposed with the estimation electric current value is applied to the electric current deviation computing section 32.

The estimation electric current value (high-frequency electric current value) is superposed on the δ-axis command electric current value $I_δ*$ to thereby generate a high frequency torque component, which is in turn transmitted to the steering mechanism 2 from the motor 3 via the speed reduction mechanism 7. As a result, the torque sensor 1 detects the high-frequency component for the estimation electric current value as well as the steering torque (applied to the steering wheel 10 by the driver). In other words, the high-frequency component for the estimation electric current value as well as the steering torque are superposed on an output signal of the torque sensor 1. The high-frequency component is extracted by the high-pass filter 47, and supplied to the load angle estimating section 49.

On the other hand, the low-pass filter 48 removes the high-frequency component, and extracts the steering torque component, which is in turn supplied to the command electric current value generating section 31A. Thus, the command electric current value generating section 31A sets the δ-axis command electric current value $I_δ*$ according to the detection steering torque T without any influence of the estimation electric current value.

The load angle estimating section 49 estimates the load angle $θ_L$ based on the high-frequency component for the estimation electric current value applied from the high-pass filter 47 and the estimation electric current value generated by the angle estimation electric current generating section 45, and then generates an estimation load angle $θ_L\hat{}$.

As can be understood from FIG. 2 described above, the orthogonal projection of the δ-axis electric current $I_δ$ to the q-axis is defined as a q-axis electric current $I_q$, and there is a relationship of $I_q = I_δ \cdot \cos θ_L$ among the δ-axis electric current $I_δ$, the q-axis electric current $I_q$ and the load angle $θ_L$.

There is a similar relationship for the estimation electric current value. Since the q-axis electric current $I_q$ corresponds to the torque to be generated by the motor 3, the torque sensor 1 detects a high-frequency torque component that corresponds to a component of the high-frequency estimation electric current value projected to the q-axis (orthogonal projection).

Therefore, the load angle estimating section 49 estimates the load angle $θ_L$ based on the estimation electric current value (δ-axis electric current component) generated by the angle estimation electric current generating section 45 and the high-frequency torque component (corresponding to the q-axis electric current component) for the estimation electric current value. As indicated by a two-dot-and-dash line in FIG. 12, a high-frequency component of a δ-axis detection electric current $I_δ$ generated by the UVW/γδ converting section 36 may be extracted by the high-pass filter 47, and this δ-axis electric current high-frequency component may be used instead of the high-frequency component of the steering torque for the estimation of the load angle $θ_L$.

The estimation load angle $θ_L\hat{}$ thus estimated by the load angle estimation section 49 is added to the previous value $θ_C(n-1)$ of the control angle $θ_C$ in the control angle computing section 26, whereby a current value $θ_C(n) = θ_C(n-1) + θ_L\hat{}$ of the control angle $θ_C$ is calculated. In this embodiment, the estimation load angle $θ_L\hat{}$ is employed as the addition angle to be added to the control angle $θ_C$. The estimation load angle $θ_L\hat{}$ corresponds to a difference between the previous value $θ_C(n-1)$ of the control angle $θ_C$ and the current rotor angle $θ_M$.

It is herein assumed, for example, that $θ_C(n-1) = θ_M(n-1)$ is established in the preceding control cycle n−1. Then, a change $θ_M(n) − θ_M(n-1)$ ($= θ_M(n) − θ_C(n-1)$) in the rotor angle $θ_M$ during a period from the preceding control cycle to the current control cycle is determined as the estimation load angle $θ_L\hat{}$. Therefore, the rotor angle in the current control cycle is $θ_M(n) = θ_M(n-1) + θ_L\hat{}$ ($= θ_C(n-1) + θ_L\hat{}$). Hence, the estimation load angle $θ_L\hat{}$ is added to the previous control angle $θ_C(n-1)$ to provide the control angle $θ_C(n) = θ_C(n-1) + θ_L$ in the current control cycle, whereby the control angle $θ_C$ can approach the rotor angle $θ_M$ or coincide with the rotor angle $θ_M$.

The γδ/UVW converting section 34 and the UVW/γδ converting section 36 each perform a coordinate conversion computing operation with the use of the control angle $θ_C$ thus computed. As previously described, the control angle $θ_C$ is close to (or equal to) the actual rotor angle $θ_M$, so that the coordinate conversion computing operation can be accurately performed. Thus, the motor 3 can be smoothly driven without the use of the rotation angle sensor, making it possible to provide excellent steering feeling.

While the three embodiments of the present invention have thus been described, the present invention may be embodied in other ways. Although the embodiments described above are directed to the arrangement in which the motor 3 is driven only by the sensorless control without the provision of the rotation angle sensor, a rotation angle sensor such as a resolver may be provided, and the sensorless control described above may be performed in case of malfunction of the rotation angle sensor. This makes it possible to continuously drive the motor 3 for continuous steering assist even during the malfunction of the rotation angle sensor.

In this case, when the rotation angle sensor is used, the δ-axis command electric current value $I_δ*$ may be generated based on the steering torque and the vehicle speed according to a predetermined assist characteristic by the command electric current value generating section 31, 31A (i.e., the function of the command electric current value generating section 31A in the embodiment shown in FIG. 12).

Where the output signal of the rotation angle sensor is used, there is no need to employ the virtual rotating coordinate system defined with respect to the control angle $θ_C$ without the need for using the control angle $θ_C$, because the output signal determines the rotor angle $θ_M$. That is, it is merely necessary to control the d-axis electric current and the q-axis electric current. Where a γδ electric current controlling section which performs electric current control with respect to the γδ-axes and a dq electric current controlling section which performs electric current control with respect to the dq-axes were both provided, however, a major portion of the memory (ROM) would be used for storing programs in microcomputer 11. Therefore, it is preferred to provide a common electric current controlling section to be shared by the γδ electric current controlling section and the dq electric current controlling section by sharing an angular variable. More specifically, the angular variable of the common electric current controlling section is used as a dq-coordinate angle when the rotation angle sensor is normal, and is used as a γδ-coordinate angle when the rotation angle sensor malfunctions. Thus, the use of the memory is suppressed, thereby making it possible to correspondingly reduce the capacity of the memory for cost reduction.

In the first embodiment described above, the addition/subtraction judging section 27 and the addition/subtraction factor multiplying section 25 are provided, and the sign of the addition angle α is properly determined to rapidly approximate the steering torque T to the command steering torque T*. Even without this arrangement, the steering torque T can be approximated to the command steering torque T*, though there may be a slight delay.

In the first embodiment described above, the γ-axis command electric current value $I_\gamma^*$ is set at zero when the abnormality judging section 30 determines that the abnormality occurs. Alternatively, a relay may be provided in a power supply line between the driving circuit 12 and the motor 3, and shut off when the occurrence of the abnormality is detected.

The embodiments described above are directed to exemplary cases in which the present invention is applied to the electric power steering apparatus, but the present invention is applicable to motor control for an electric pump hydraulic power steering apparatus. Further, the present invention is applicable to control of a brushless motor provided in a vehicle steering apparatus such as a steer-by-wire (SBW) system or a variable gear ratio (VGR) steering system other than the power steering apparatus. Of course, the inventive motor controller is applicable not only to the motor control for the vehicle steering apparatus but also to motor control in other applications.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2008-171496 filed in the Japanese Patent Office on Jun. 30, 2008, the disclosure of which is incorporated herein by reference in its entirety.

REFERENCE SIGNS LIST

1: Torque sensor
3: Motor
4: Steering angle sensor
5: Motor controller
11: Microcomputer
26: Control angle computing section
50: Rotor
51,52,53: Stator coils
55: Stator

The invention claimed is:

1. A motor controller for controlling a motor including a rotor and a stator opposed to the rotor, the motor controller comprising:
a torque detecting unit which detects a torque applied to an object to be driven by the motor;
at least one processor;
at least one computer-readable storage medium, the at least one computer-readable storage medium storing instructions that when executed cause the at least one processor to perform as:
a command torque setting unit which sets a command torque;
an electric current driving unit which drives the motor with an axis electric current value defined in a rotating coordinate system defined with respect to a control angle that is a rotation angle for control and calculated without using an input from a rotation angle sensor that detects a rotation angle of the rotor so that the control angle is determined independently from the rotation angle of the rotor;
a control angle computing unit which computes a current value of the control angle by adding an addition angle to a previous value of the control angle in each predetermined computing cycle;
an addition angle computing unit which computes, without detecting a change of the rotation angle of the rotor, the addition angle according to a deviation of the torque detected by the torque detecting unit from the command torque set by the command torque setting unit, and
a limiting unit which limits the addition angle.

2. A vehicle steering apparatus comprising:
a motor which applies a driving force to a steering mechanism of a motor vehicle, the motor including a rotor and a stator opposed to the rotor;
a torque detecting unit which detects a steering torque applied to an operation member of the motor vehicle; and
a motor controller for controlling the motor;
the motor controller including:
a command steering torque setting unit which sets a command steering torque;
an electric current driving unit which drives the motor with an axis electric current value defined in a rotating coordinate system defined with respect to a control angle that is a rotation angle for control and calculated without using an input from a rotation angle sensor that detects a rotation angle of the rotor so that the control angle is determined independently from the rotation angle of the rotor;
a control angle computing unit which computes a current value of the control angle by adding an addition angle to a previous value of the control angle in each predetermined computing cycle;
an addition angle computing unit which computes, without detecting a change of the rotation angle of the rotor, the addition angle according to a deviation of the steering torque detected by the torque detecting unit from the command steering torque set by the command steering torque setting unit; and
a limiting unit which limits the addition angle.

3. The vehicle steering apparatus according to claim 2, further comprising:
a steering angle detecting unit which detects a steering angle of the operation member;

wherein the command steering torque setting unit sets the command steering torque according to the steering angle detected by the steering angle detecting unit.

4. The vehicle steering apparatus according to claim 2, wherein the command steering torque setting unit sets the command steering torque according to a vehicle speed of the motor vehicle detected by a vehicle speed detecting unit which detects the vehicle speed of the motor vehicle.

5. The vehicle steering apparatus according to claim 2, further comprising:
- an abnormality judging unit which deter nines occurrence of an abnormality when an absolute value of a deviation of the steering torque detected by the torque detecting unit from the command steering torque set by the command steering torque setting unit is not less than a predetermined deviation threshold, or when an absolute value of the steering torque detected by the torque detecting unit is not less than a predetermined torque threshold.

* * * * *